(12) United States Patent  
Tripathi et al.

(10) Patent No.: US 9,153,212 B2  
(45) Date of Patent: Oct. 6, 2015

(54) COMPRESSED FRAME WRITEBACK AND READ FOR DISPLAY IN IDLE SCREEN ON CASE

(71) Applicant: Apple Inc., Cupertino, CA (US)

(72) Inventors: Brijesh Tripathi, Los Altos, CA (US); Peter F. Holland, Los Gatos, CA (US); Albert C. Kuo, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 13/850,548

(22) Filed: Mar. 26, 2013

(65) Prior Publication Data

US 2014/0292787 A1    Oct. 2, 2014

(51) Int. Cl.
  *G09G 5/395* (2006.01)
  *G06F 3/14* (2006.01)
  *G09G 5/00* (2006.01)
  *G09G 5/393* (2006.01)

(52) U.S. Cl.
  CPC ........ *G09G 5/395* (2013.01); *G06F 3/14* (2013.01); *G09G 5/001* (2013.01); *G09G 5/393* (2013.01); *G09G 2330/02* (2013.01); *G09G 2330/021* (2013.01); *G09G 2340/02* (2013.01); *G09G 2360/121* (2013.01)

(58) Field of Classification Search
  None
  See application file for complete search history.

(56) References Cited

U.S. PATENT DOCUMENTS

| | | | |
|---|---|---|---|
| 5,512,921 A | 4/1996 | Mital et al. | |
| 5,961,617 A | 10/1999 | Tsang | |
| 6,731,290 B2 | 5/2004 | Cui | |
| 7,042,461 B2 | 5/2006 | Cui | |
| 8,103,894 B2 | 1/2012 | Balakrishnan et al. | |
| 8,285,936 B2 | 10/2012 | Roberts et al. | |
| 9,058,676 B2 | 6/2015 | Tripathi et al. | |
| 2004/0174369 A1* | 9/2004 | Cui | 345/501 |
| 2006/0143382 A1 | 6/2006 | Damaraju et al. | |
| 2007/0186057 A1 | 8/2007 | Moll et al. | |
| 2007/0288776 A1 | 12/2007 | DeMent et al. | |
| 2008/0100636 A1 | 5/2008 | Lai et al. | |
| 2008/0143695 A1 | 6/2008 | Juenemann et al. | |
| 2010/0122100 A1 | 5/2010 | Strumper | |
| 2010/0123727 A1 | 5/2010 | Kwa et al. | |
| 2011/0199377 A1* | 8/2011 | Jang et al. | 345/426 |
| 2012/0159074 A1 | 6/2012 | Sodhi et al. | |

(Continued)

OTHER PUBLICATIONS

Han et al.; "Using Checksum to Reduce Power Consumption of Display Systems for Low-Motion Content;" Proc. IEEE International Conference on Computer Design, Oct. 4-7, 2009, Lake Tahoe, CA; pp. 47-53.

(Continued)

*Primary Examiner* — Maurice L McDowell, Jr.
(74) *Attorney, Agent, or Firm* — Meyertons, Hood, Kivlin, Kowert & Goeztel, P.C.

(57) ABSTRACT

In an embodiment, a display pipe is configured to composite one or more frames of images and/or video sequences to generate output frames for display. Additionally, the display pipe may be configured to compress an output frame and write the compressed frame to memory responsive to detecting static content in the output frames. The display pipe may also be configured to read the compressed frame from memory for display instead of reading the frames for compositing and display. In some embodiments, the display pipe may include an idle screen detect circuit configured to monitor the operation of the display pipe and/or the output frames to detect the static content.

19 Claims, 6 Drawing Sheets

(56) References Cited

U.S. PATENT DOCUMENTS

2012/0188262 A1 7/2012 Rabii
2014/0181410 A1 12/2012 Kalamatianos et al.

OTHER PUBLICATIONS

U.S. Appl. No. 13/890,306, filed May 9, 2013, entitled "Memory Power Savings in Idle Display Case," inventors Sukalpa Biswas, Shinye Shiu, Cyril de la Cropte de Chanterac, Manu Gulati, Pulkit Desai, and Rong Zhang Hu.

U.S. Appl. No. 13/850,565, filed Mar. 26, 2013, entitled "Mechanism to Detect Idle Screen On," inventors Brijesh Tripathi, Peter Holland, and Albert Kuo.

U.S. Appl. No. 13/866,282, filed Apr. 19, 2013, entitled "A Cache Allocation Scheme Optimized for Browsing Applications," inventors Sukalpa Biswas, Wolfgang Klingauf, Rong Zhang Hu, and Shinye Shiu.

International Search Report and Written Opinion from PCT/US2014/031343, mailed Jul. 1, 2014, Apple Inc., pp. 1-8.

"Drowsy Caches: Simple Techniques for Reducing Leakage Power", Krisztian Flautner, et al., May 25, 2002, pp. 148-157.

Office Action, U.S. Appl. No. 13/890,390, filed May 9, 2013, pp. 15, dated May 6, 2015.

Office Action from U.S. Appl. No. 13/850,565, issued Nov. 28, 2014, pp. 1-13.

\* cited by examiner

COMPRESSED FRAME WRITEBACK AND READ FOR DISPLAY IN IDLE SCREEN ON CASE

BACKGROUND

1. Field of the Invention

This invention is related to the field of digital systems and, more particularly, to low power mechanisms for managing displays in digital systems.

2. Description of the Related Art

Digital systems of various types often include, or are connected to, a display for the user to interact with the device. The display can be incorporated into the device. Examples of incorporated displays include the touchscreen on various smart phones, tablet computers, or other personal digital assistants. Another example of the incorporated display is a laptop with the screen in the lid. The display can also be connected to the device via a cable. Examples of the connected display include various desktop computers and workstations having a separate display that resides on the desk in front of the user. Some desktops also have an incorporated display (e.g. various iMac® computers from Apple Inc.). The display provides a visual interface that the user can view to interact with the system and applications executing on the system. In some cases (e.g. touchscreens), the display also provides a user interface to input to the system. Other user input devices (e.g. keyboards, mice or other pointing devices, etc.) can also be used.

In many cases, the images being display over a period of time are essentially static. For example, if the user is reading an ebook on the display, the display may be statically displaying a page of text until the user is finished reading the page. When a movie is paused, there may be no change in the images for the time that the pause is in effect. When a user is browsing web pages, again the user may be absorbing content and the images may be static. When there is little or no change in the static images being displayed, the memory bandwidth consumed to fetch the image each refresh cycle of the screen may be wasteful in both the bandwidth and in power consumed.

SUMMARY

In an embodiment, a display pipe is configured to composite one or more frames of images and/or video sequences to generate output frames for display. Additionally, the display pipe may be configured to compress an output frame and write the compressed frame to memory. The display pipe may write the compressed frame to memory responsive to detecting a series of successive frames with static content. The display pipe may also be configured to read the compressed frame from memory for display instead of reading the frames for compositing and display responsive to detecting the series. Since the image is generally unchanging in when the content is static, the compressed frame may be an accurate representation of the image to be displayed. In other embodiments, the frame may not be compressed but may still be written back to memory. In such embodiments, the display pipe need not composite the frames again as long as the static content remains. Instead, the composited but uncompressed frame may be read from memory and displayed.

In some embodiments, the display pipe may include an idle screen detect circuit. The idle screen detect circuit may be configured to monitor the operation of the display pipe and/or the output frames, and may detect the static content. For example, the idle screen may be detected if a set of N consecutive frames are generated without significant change between the frames. A variety of mechanisms for detecting the static content are described.

BRIEF DESCRIPTION OF THE DRAWINGS

The following detailed description makes reference to the accompanying drawings, which are now briefly described.

Figure 1:
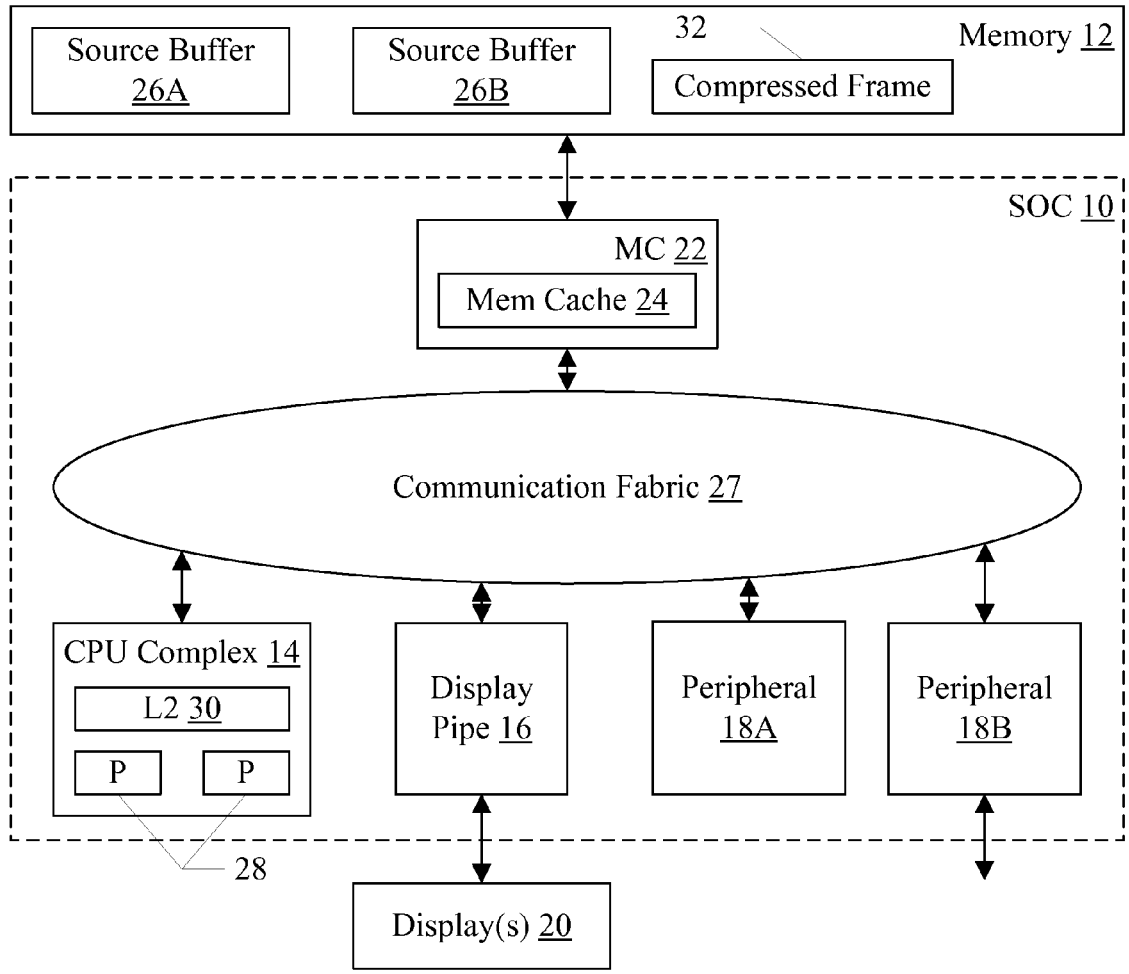
FIG. 1 is a block diagram of one embodiment of a system on a chip (SOC) coupled to a memory and a display.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits.

Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram of one embodiment of an SOC 10 is shown coupled to a memory 12 and one or more display devices 20. A display device may be more briefly referred to herein as a display. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, a display pipe 16, peripheral components 18A-18B (more briefly, "peripherals"), a memory controller 22, and a communication fabric 27. The components 14, 16, 18A-18B, and 22 may all be coupled to the communication fabric 27. The memory controller 22 may be coupled to the memory 12 during use. Similarly, the display pipe 16 may be coupled to the displays 20 during use. In the illustrated embodiment, the CPU complex 14 includes one or more processors 28 and a level two (L2) cache 30.

The display pipe 16 may include hardware to process one or more still images and/or one or more video sequences for display on the displays 20. Generally, for each source still image or video sequence, the display pipe 16 may be configured to generate read memory operations to read the data representing the frame/video sequence from the memory 12 through the memory controller 22. The display pipe 16 may be configured to perform any type of processing on the image data (still images, video sequences, etc.). In one embodiment, the display pipe 16 may be configured to scale still images and to dither, scale, and/or perform color space conversion on the frames of a video sequence. The display pipe 16 may be configured to blend the still image frames and the video sequence frames to produce output frames for display. The display pipe 16 may also be more generally referred to as a display control unit. A display control unit may generally be any hardware configured to prepare a frame for display from one or more sources, such as still images and/or video sequences.

More particularly, the display pipe 16 may be configured to read one or more source buffers 26A-26B stored in the memory 12, composite frames from the source buffers, and display the resulting frames on the display 20. Accordingly, the frames displayed on the display 20 may not be directly retained during normal (dynamic operation). However, if static content is detected for a set of successive frames, the display pipe 16 may be configured to compress the resulting frame and write the compressed frame to a compressed frame buffer 32 in the memory 12. Accordingly, the static content may be available for read and display, and the power consumed to read the multiple source buffers 26A-26B and composite the image data to generate the output frame may be avoided. In another embodiment, the resulting frame may be written back to memory 12 without compression. The frame may be read and displayed.

If the source buffers 26A-26B contain full frames, the amount of data read may be reduced by a factor equal to the number of source buffers 26A-26B multiplied by the compression ratio achieved in the compressed frame compared to the full size frame. In some embodiments in which the memory cache 24 is included, the compressed frame may be more likely to fit in the memory cache 24 than the source buffers 26A-26B, reducing access to the memory 12 and thus power consumed in the accesses as well. A larger percentage of the compressed frame may be stored in the memory cache 24 in cases in which the compressed frame does not fit entirely in the memory cache 24.

In one embodiment, the display pipe 16 may include circuitry configured to monitor for frames with static content. More particularly, the display pipe 16 may identify multiple successive frames with static content. Generally, static content may refer to content that is not changing from frame to frame (e.g. each pixel is the same from frame to frame) or to content that is changing by less than a threshold amount, so that displaying the compressed frame from the compressed frame buffer 32 is a close approximation to the current frame. Detecting multiple successive frames having the static content may identify an idle screen on case. The idle screen on case may be the case in which the displayed visual content is not changing over a period of time, or is changing very little, but the display is on. The user may be viewing the displayed data, such as an ebook, a web page or an email. Or, the user may have paused a video.

The displays 20 may be any sort of visual display devices. The displays may include, for example, touch screen style displays for mobile devices such as smart phones, tablets, etc. Various displays 20 may include liquid crystal display (LCD), light emitting diode (LED), plasma, cathode ray tube (CRT), etc. The displays may be integrated into a system including the SOC 10 (e.g. a smart phone or tablet) and/or may be a separately housed device such as a computer monitor, television, or other device. The displays may also include displays coupled to the SOC 10 over a network (wired or wireless).

In some embodiments, the displays 20 may be directly connected to the SOC 10 and may be controlled by the display pipe 16. That is, the display pipe 16 may include hardware (a "backend") that may provide various control/data signals to the display, including timing signals such as one or more clocks and/or the vertical blanking interval and horizontal blanking interval controls. The clocks may include the pixel clock indicating that a pixel is being transmitted. The data signals may include color signals such as red, green, and blue, for example. The display pipe 16 may control the displays 20 in real-time, providing the data indicating the pixels to be displayed as the display is displaying the image indicated by the frame. The interface to such displays 20 may be, for example, VGA, HDMI, digital video interface (DVI), a liquid crystal display (LCD) interface, a plasma interface, a cathode ray tube (CRT) interface, any proprietary display interface, etc.

The CPU complex 14 may include one or more CPU processors 28 that serve as the CPU of the SOC 10. The CPU of the system includes the processor(s) that execute the main control software of the system, such as an operating system. Generally, software executed by the CPU during use may control the other components of the system to realize the desired functionality of the system. The CPU processors 28 may also execute other software, such as application programs. The application programs may provide user functionality, and may rely on the operating system for lower level device control. Accordingly, the CPU processors 28 may also be referred to as application processors. The CPU complex may further include other hardware such as the L2 cache 30 and/or an interface to the other components of the system (e.g. an interface to the communication fabric 27).

The peripherals 18A-18B may be any set of additional hardware functionality included in the SOC 10. For example, the peripherals 18A-18B may include video peripherals such as video encoder/decoders, image signal processors for image sensor data such as camera, scalers, rotators, blenders, graphics processing units, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 22 may include various queues for buffering memory operations, data for the operations, etc., and the circuitry to sequence the operations and access the memory 12 according to the interface defined for the memory 12.

In the illustrated embodiment, the memory controller 22 may include a memory cache 24. The memory cache 24 (more briefly, mem cache or MCache) may store data that has been read from and/or written to the memory 12. The memory controller 22 may check the memory cache 24 prior to initiating access to the memory 12. Power consumption on the memory interface to the memory 12 may be reduced to the extent that mem cache hits are detected (or to the extent that mem cache allocates are performed for write operations). Additionally, latency for accesses that are mem cache hits may be reduced as compared to accesses to the memory 12, in some embodiments.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

Figure 2:
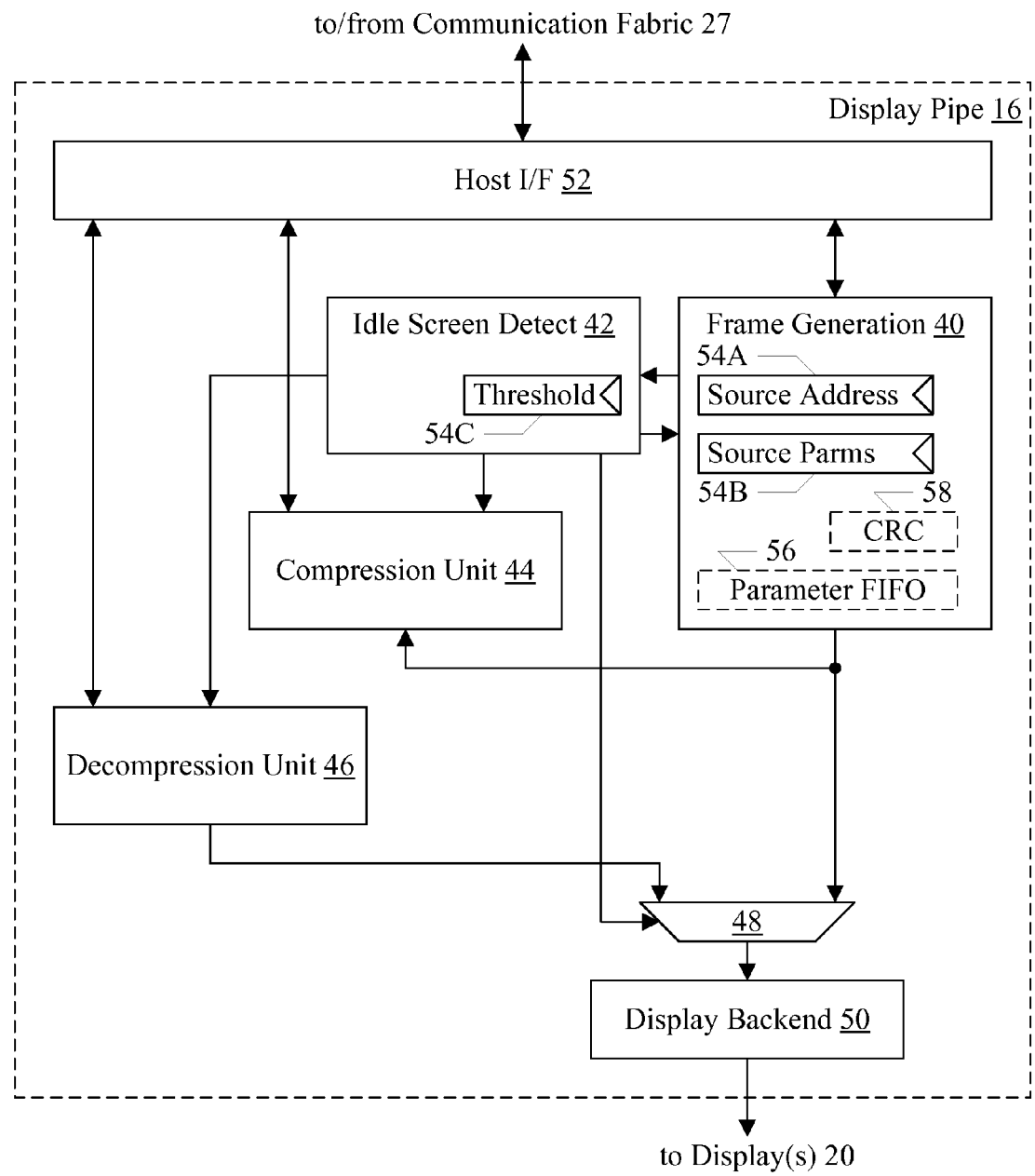
FIG. 2 is a block diagram of one embodiment of a display pipe shown in FIG. 1.

Turning now to FIG. 2, a block diagram of one embodiment of the display pipe 16 is shown in greater detail. In the illustrated embodiment, the display pipe 16 includes a frame generation unit 40, an idle screen detect circuit 42, a compression unit 44, a decompression unit 46, a multiplexor (mux) 48, a display backend unit 50, and a host interface (I/F) unit 52. The host interface unit 52 is coupled to the communication fabric 27, and to the frame generation unit 40, the compression unit 44, and the decompression unit 46. The frame generation unit 40 is further coupled to the idle screen detect circuit 42, the compression unit 44, and an input to the mux 48. The idle screen detect circuit 42 is still further coupled to the compression unit 44, the decompression unit 46, and the selection control to the mux 48. The decompression unit 46 is further coupled to an input of the mux 48. The output of the mux 48 is coupled to the display backend unit 50.

During "normal" operation, when the idle screen on case is not detected, the frame generation unit 40 may be configured to fetch image data from source buffers 26A-26B in the memory 12 and generate output frames. In an embodiment, the frame generation unit may be configured to composite image data from multiple source buffers to generate an output frame. Compositing may include any processing by which image data from various images (e.g. frames from each video sequence and/or still image) are combined to produce an output image. Compositing may include blending, scaling, rotating, color space conversion, etc. In general, pixels from two or more source buffers may overlap in the output frame, and the frame generation unit 40 may be configured to operate on the pixels to produce a corresponding output pixel of the output frame.

The frame generation unit 40 includes a set of configuration registers, including registers 54A-54B. The set of configuration registers 54A-54B may be programmable with data that identifies the various source buffers 26A-26B in the memory 12 that are to be fetched and composited to produce an output frame. For example, configuration registers may be programmed with a source address of each source buffer in memory. Various other parameters (source parms) may also be programmed into the configuration registers. The parameters may include additional data describing the image data (e.g. the data format, color space, the number of bits/pixel, the resolution of the frame, etc.). The parameters may further include data describing the compositing to be performed (e.g. scaling, rotation, etc.).

In some embodiments, the frame generation unit 40 may include a parameter first in, first out buffer (FIFO) 56. The parameter FIFO 56 may store values to be written to the configuration registers 54A-54B for subsequent frames. The same configuration of registers may be used for multiple frame generations, in some embodiments, and thus the parameter FIFO 56 may include data that indicates how many frames should be processed with a given configuration before a new configuration is used. The parameter FIFO 56 may further store register addresses of the configuration registers 54A-54B and data to be written to those registers 54A-54B. The parameter FIFO 56 may thus be a mechanism to queue a stream of frame processing in the display pipe 16 and then permit the display pipe 16 to perform the stream.

In some embodiments, the frame generation unit 40 may include a cyclic redundancy check (CRC) circuit 58. The CRC circuit 58 may be configured to generate a CRC value on the output frames, in one embodiment. In another embodiment, the CRC circuit 58 may be configured to generate a CRC value on the next set of configuration register writes in the parameter FIFO 56. The CRC value may be used as part of the monitoring for static content, as describe in more detail below.

The idle screen detect circuit 42 may monitor the frame generation unit 40 to detect static content in a series of N successive frames, where N may be programmable as a threshold in a configuration register 54C in the illustrated embodiment. In other embodiments, N may be fixed. In either case N may be an integer greater than one. If the static content is detected for N successive frames, the idle screen detect circuit may determine that the idle screen on case is occurring. In response, the idle screen detect circuit 42 may be configured to generate one or more output signals indicating the detection of the idle screen on case. For example, the idle screen detect circuit 42 may activate the compression unit 44, which may be coupled to receive the output frame from the frame generation unit 40. The compression unit 44 may be configured to compress the output frame using any desired compression algorithm, and may write the compressed frame to the compressed frame buffer 32 in the memory 12. In one embodiment, the compression algorithm may include applying one or more passes through a wavelet transform. The resulting coefficients may be ordered into significance groups and transmitted in order of significance. In an embodiment, the compression unit 44 and the decompression unit 46 may be coupled to a configuration register (not shown in FIG. 2) that locates the compressed frame buffer 32 in the memory 12. In other embodiments, compression may not be implemented and the idle screen detection circuit may signal the host interface unit 52 to write back the uncompressed output frame.

Once the compressed frame is generated by the compression unit 44 (or the uncompressed output frame is written to memory), the idle screen detection circuit 42 may be configured to disable the frame generation unit 40. In one embodiment, the idle screen detect circuit 42 may be configured to permit the frame generation unit 40 to generate the idle frame one more time after detecting the idle screen on case, so that the compression may be performed by the compression unit 44. Disabling the frame generation unit 40 may include simply idling the unit, clock gating the unit, and/or powering down the unit in various embodiments.

The idle screen detect circuit 42 may be coupled to the mux 48 to select between the output of the frame generation unit 40 (in dynamic mode, and during compression of the output frame) and the output of the decompression unit 46 (during idle screen on mode). The decompression unit 46 may read the compressed frame from the compressed frame buffer 32, decompress the frame, and provide the decompressed frame to the mux 48. More particularly, the idle screen detect circuit 42 may be configured to generate output signals to enable the decompression unit 46 and to select the output of the decompression unit 46 through the mux 48 responsive to detecting the idle screen on case.

The selected frame is provided to the display backend unit 50, which may control the interface to the display 20 as discussed above. That is, the display backend unit 50 may be configured to generate the control signals to the display 20, such as the vertical blanking interval (VBI), various clock signals, and the pixel data signals as well. The form of the interface may vary from embodiment to embodiment, depending on the display 20.

The host interface unit 52 may be configured to transmit and receive memory operations on behalf of the other components of the display pipe 16. For example, read operations from the frame generation unit 40 to the source buffers 26A-26B may be managed by the host interface unit 52, and may read operations from the decompression unit 46 to the compressed frame buffer 32. Write operations from the compression unit 44 to the compressed frame buffer 32 may also be managed by the host interface unit 52.

Figure 3:
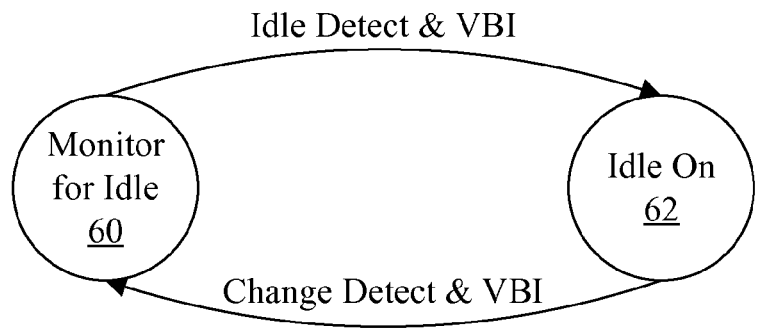
FIG. 3 is a state machine implemented in one embodiment of the display pipe shown in FIG. 2.

FIG. 3 is a state machine diagram illustrating a state machine that may be implemented by one embodiment of the idle screen detect circuit 42. Generally, the state machine may remain in a given state until the conditions illustrated on an arc exiting that state are detected. In the embodiment of FIG. 3, the state machine includes a monitor for idle state 60 and an idle on state 62. The monitor for idle state 60 may be the normal, dynamic mode in which frame content may be changing and the frame generation unit 40 is actively generating frames at the frame rate supported by the display 20. If the idle screen detect circuit 42 detects the idle screen on case (e.g. N successive frames of static content), the state machine may transition to the idle on state 62. In the idle on state 62, the compressed frame is being read from memory and displayed, and the frame generation unit 40 may be disabled. If a change is detected in the content of the frames, the state machine may transition to the monitor for idle state 60. Both transitions may be synchronized to the vertical blanking interval (VBI) between frames, in the illustrated embodiment.

In an embodiment, the idle screen detect circuit 42 may be configured to select the output of the frame generation unit 40 through the mux 48 in the monitor for idle state 60, and may be configured to select the output of the decompression unit 46 through the mux 48 in the idle on state 62.

Figure 4:
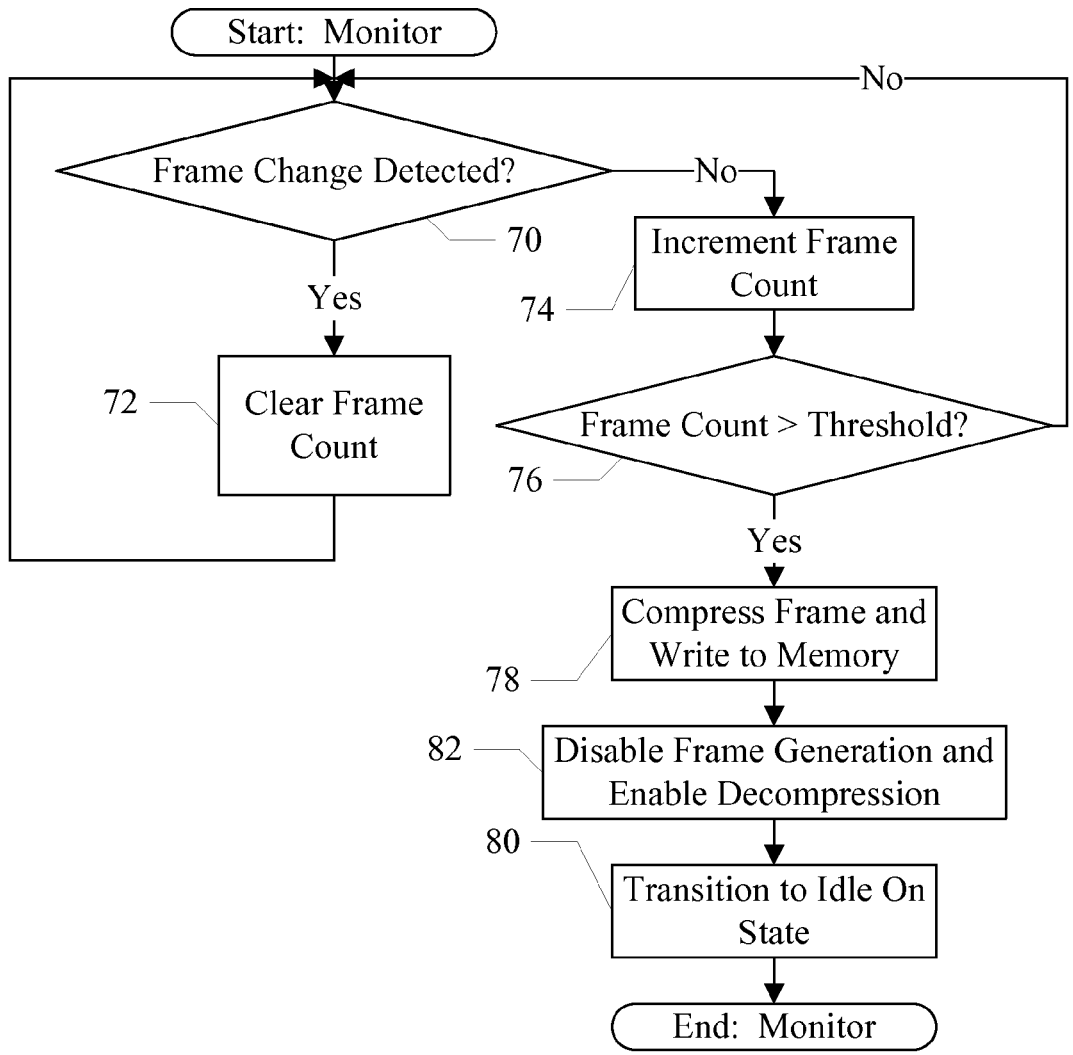
FIG. 4 is a flowchart illustrating operation of one embodiment of the display pipe shown in FIG. 2 in a monitor for idle state of the state machine shown in FIG. 3.

FIG. 4 is a flowchart illustrating certain operation of one embodiment of the display pipe 16 (and various components thereof) in the monitor for idle state 60, for one embodiment. While the blocks are shown in a particular order for ease of understanding, other orders may be used. Blocks may be performed in parallel in combinatorial logic circuitry in the display pipe 16 (and components thereof). Blocks, combinations of blocks, and/or the flowchart as a whole may be pipelined over multiple clock cycles. The display pipe 16 (and components thereof) may be configured to implement the operation shown in FIG. 4.

Figure 5:
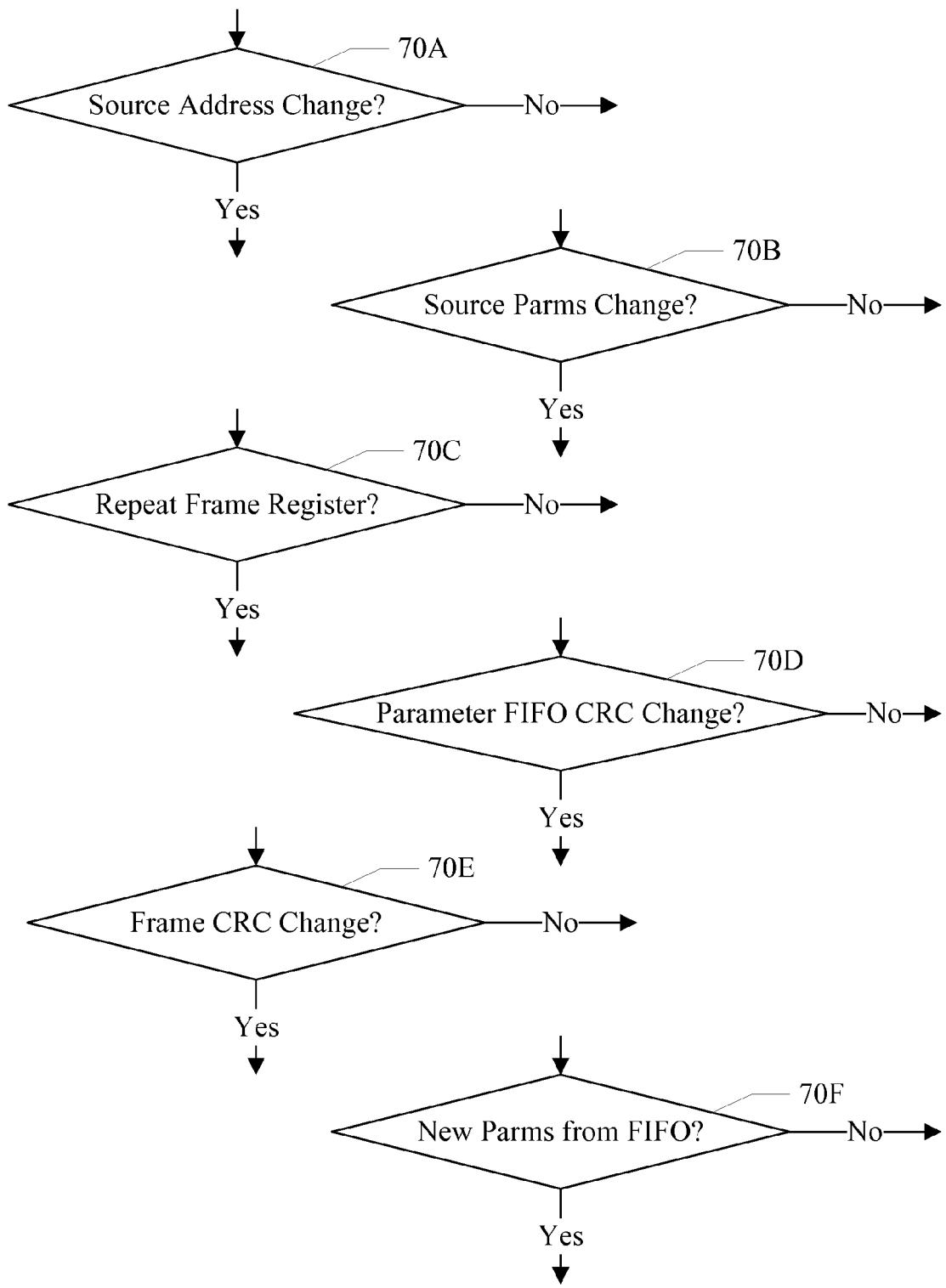
FIG. 5 is a set of partial flowcharts illustrating various embodiments of detecting a frame change in FIG. 4.

The idle screen detect circuit 42 may be configured to detect whether or not the content of the current frame is changing from the previous frame (decision block 70). There may be a variety of mechanisms for detecting whether or not the content is changing. Some embodiments are illustrated in FIG. 5 and discussed in more detail below. If the content is changing (decision block 70, "yes" leg), the idle screen detect circuit 42 may be configured to clear an idle frame count (block 72) and to monitor for the next frame. The idle frame count may be a count maintained by the idle screen detect circuit 42 to track the number of successive frames that have been detected as having static content. If the frame content is not changing (decision block 70, "no" leg), the idle screen detect circuit 42 may be configured to increment the idle frame count (block 74). If the idle frame count exceeds the threshold in the configuration register 54C (decision block 76, "yes" leg), the idle screen on case may be detected. The idle screen detect circuit 42 may be configured to enable the compression unit 44, which may be configured to compress the frame output by the frame generation unit 40 and write the compressed frame to memory (block 78). In some embodiments, the memory operations may include cache hints indicating whether or not the accessed data should be allocated into the memory cache 24. The write operations from the compression unit 44 may include hints to allocate, so that the compressed frame data may be more likely to be cached in the memory cache 24. As mentioned previously, in some cases the frame output by the frame generation unit 40 may be written back to memory uncompressed. The idle screen detect circuit 42 may be configured to disable the frame generation unit 40 and enable the decompression unit 46 responsive to completing the compressed frame. The idle screen detect circuit 42 may be configured to transition to the idle on state 62, synchronized to VBI as mentioned above (block 80).

FIG. 5 illustrates a variety of embodiments of the frame change detect block 70 from FIG. 4. One or more of the embodiments may be implemented, in any combination, as the mechanisms to detect whether or not a content of a current frame is changing from the previous frame.

The idle screen detect circuit 42 may monitor the source address configuration registers 54A (decision block 70A). If the source address is being modified, a new source buffer 26A-26B is being identified and thus the content is likely to be changing. Such an embodiment may be used, e.g., if the source of the image data in the source buffers (e.g. software executing on a processor 28, a graphics processing unit (GPU), etc.) prepares a new source buffer for each new rendering of an image while a current source buffer is being displayed. That is, once the display pipe 16 is pointed to a source buffer 26A-26B, the content in the source buffer may not be modified. In embodiments in which the frame generation unit 40 composites data from multiple source buffers to generate a frame, there may be a source buffer address for each source buffer. A modification of any source buffer address may be detected as a lack of static content (a change in frame content).

The idle screen detect circuit 42 may detect if any other source parameters besides the source address are being modified (decision block 70B). For example, if a scale factor or rotation is being changed, then the content of the output frame may be changing even if the source frame contents are the same. It is noted that, in the context of monitoring for frame content change, modification of a configuration register may refer to actually changing the value stored in the register. That is, it is possible for a configuration register to be written with the same value that it already stores. Such a write may not be viewed as a modification. In other embodiments, the idle screen detect circuit 42 may treat any write to a configuration register as a modification. In embodiments in which the frame generation unit 40 composites data from multiple source buffers to generate a frame, there may be a source parameter parameters for each source buffer. A modification of any source buffer parameter corresponding to any source buffer may be detected as a lack of static content (a change in frame content). In some embodiments, certain configuration registers may not impact the frame content. For example, some configuration registers may store control data such as quality of service levels for the memory requests, interrupt configuration, etc. Such configuration may be changed without changing the frame content. Modifications to such configuration registers may be excluded from monitoring.

In some embodiments, a repeat frame register may be supported as one of the configuration registers. The repeat frame register may be programmed, e.g., with a repeat count indicating a number of iterations to repeat the frame. Alternatively, the repeat frame register may be programmed with a flag indicating that the current frame is to be repeated until the flag is cleared. In such embodiments, the idle screen detect circuit 42 may monitor the repeat frame register, and if repeat is indicated, then no change in the content of the frame may be detected (decision block 70C).

In one embodiment that implements the CRC circuit 58 and the parameter FIFO 56, the frame generation unit 40 may generate a CRC value over the parameters that are to be written to the configuration registers for the next frame. If the CRC value is the same as the previous CRC value, generated prior to the programming from the parameter FIFO 56 for the current frame, then the same configuration is being used and thus idle screen detect circuit may be configured to detect no change in content (decision block 70D). In some embodiments, the CRC value may be generated over a subset of the configuration registers (e.g. those registers which indicate a change in content rather than other control data such as interrupt configuration).

In another embodiment in which the CRC circuit 58 generates a CRC value over each output frame generated by the frame generation unit 40, the idle screen detect circuit 42 may be configured to determine a frame change by comparing the current CRC value (generated from the current output frame) with the CRC value generated over the previous frame. If the CRC values are the same, then no change in the content may be detected (decision block 70E).

In an embodiment that implements the parameter FIFO 56, if new parameters are read from the FIFO to program the configuration registers in the frame generation unit 40, then the idle screen detect circuit 42 may be configured to detect that the content of the frame is likely to be changing (decision block 70F).

Figure 6:
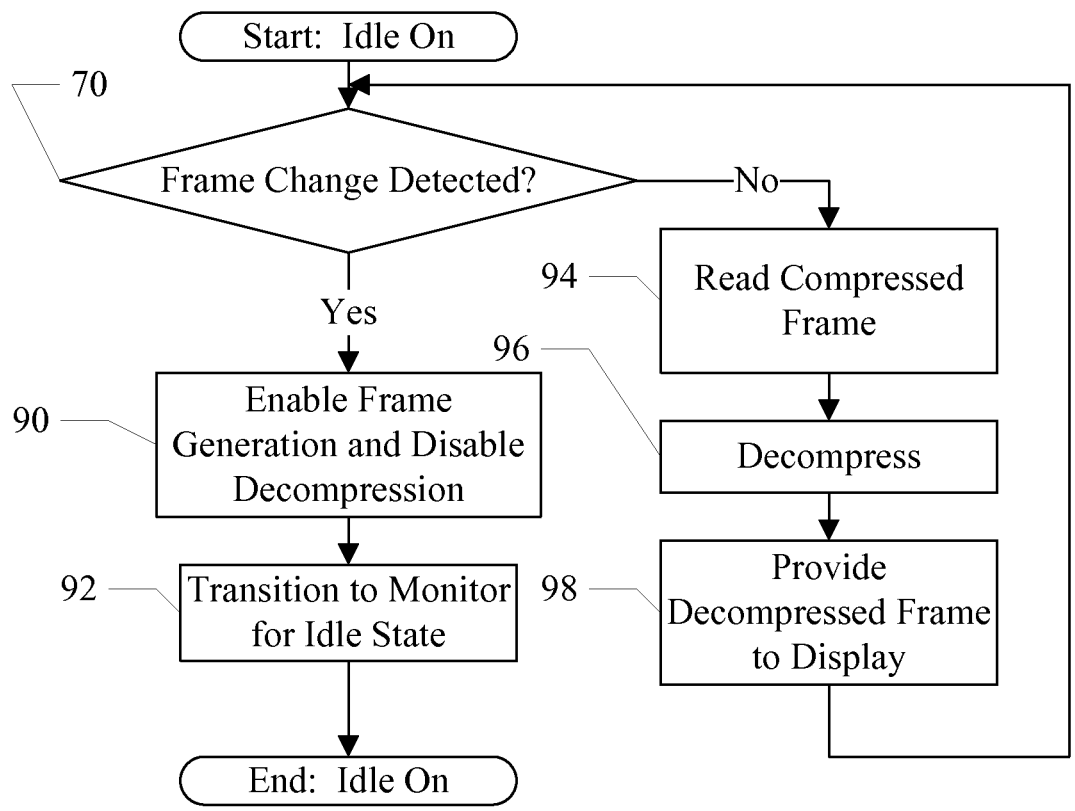
FIG. 6 is a flowchart illustrating operation of one embodiment of the display pipe shown in FIG. 2 in an idle on state of the state machine shown in FIG. 3.

Turning next to FIG. 6, a flowchart illustrating certain operation of one embodiment of the display pipe 16 (and various components thereof) in the idle on state 62 is shown, for one embodiment. While the blocks are shown in a particular order for ease of understanding, other orders may be used. Blocks may be performed in parallel in combinatorial logic circuitry in the display pipe 16 (and components thereof). Blocks, combinations of blocks, and/or the flowchart as a whole may be pipelined over multiple clock cycles. The display pipe 16 (and components thereof) may be configured to implement the operation shown in FIG. 6.

The idle screen detect circuit 42 may continue to monitor for changes in the content of the frames (decision block 70). Similar mechanisms to those shown in FIG. 5 may be used. If a frame content change is detected (decision block 70, "yes" leg), the idle screen detect circuit 42 may be configured to enable the frame generation unit 40 and disable the decompression unit 46 (block 90). The idle screen detect unit 42 may be configured to transition the state machine to the monitor for idle state 60 (block 92) (synchronized to VBI, as mentioned above).

If the frame content is not changing (decision block 70, "no" leg), the decompression unit 46 may be configured to read the compressed frame from the compressed frame buffer 32 (block 94) and may be configured to decompress the data (block 96). The decompression unit 46 may be configured to provide the decompressed frame through the mux 48 to the display (block 98). In embodiments that do not implement compression, the decompression may be skipped and the uncompressed frame may be provided through the mux 48.

Figure 7:
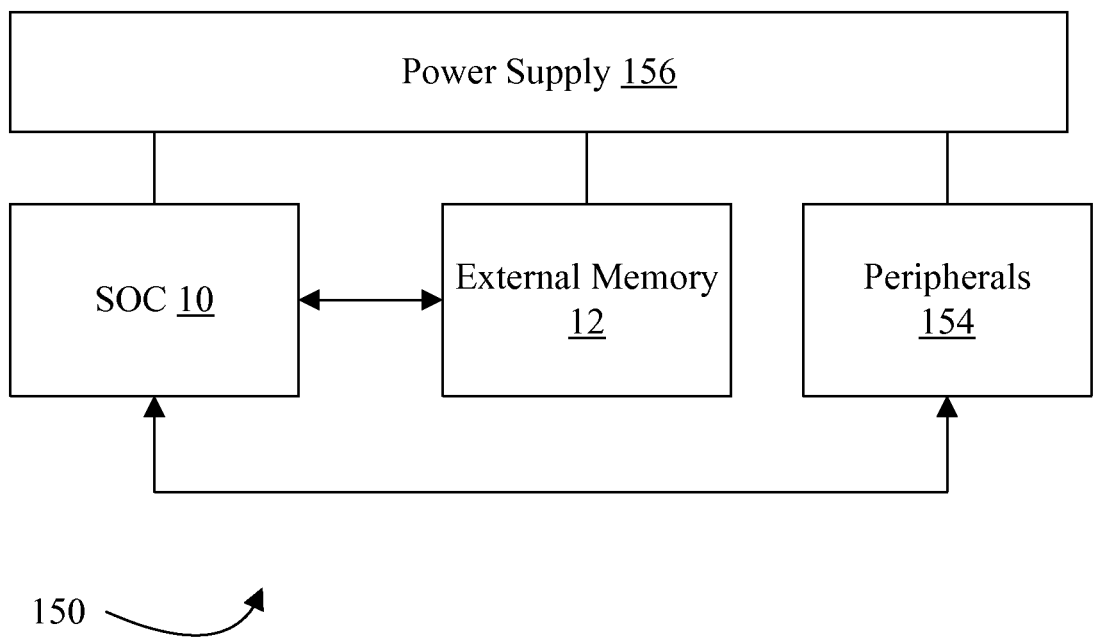
FIG. 7 is a block diagram of a system including the SOC shown in FIG. 1.

Turning next to FIG. 7 a block diagram of one embodiment of a system 150 is shown. In the illustrated embodiment, the system 150 includes at least one instance of the SOC 10 coupled to one or more peripherals 154 and the external memory 12. A power supply 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. The displays 20 may be peripherals 154, in some embodiments. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A display control unit comprising:
   a frame generation unit configured to generate a frame from image data in a plurality of source buffers in memory, the frame to be displayed on a display device controlled by the display control unit;
   a compression unit coupled to receive the frame from the frame generation unit, wherein the compression unit is configured to compress the frame and write the compressed frame to the memory responsive to an indication that a plurality of successive frames generated by the frame generation unit have static content; and
   a decompression unit configured to read the compressed frame from the memory and decompress the frame to provide to the display device instead of an output of the frame generation unit, wherein the frame generation unit is idle during a time that the decompressed frame is being displayed.

2. The display control unit as recited in claim 1 further comprising a display backend circuit coupled to receive a selected frame from either the decompression unit or the frame generation unit, wherein the display backend circuit is configured to control an interface to the display device.

3. The display control unit as recited in claim 2 wherein a change of the selected frame between the output of the frame generation unit and a decompressed frame from the decompression unit is synchronized to a vertical blanking interval of the display device.

4. The display control unit as recited in claim 1 wherein the frame generation unit is enabled responsive to detecting that the frame to be displayed no longer has the static content.

5. The display control unit as recited in claim 1 further comprising a control circuit coupled to the frame generation unit and the compression unit, wherein the control circuit is configured to generate the indication that the plurality of successive frames have the static content responsive to monitoring the frame generation unit, and wherein the control circuit, responsive to detecting that the plurality of successive frames have the static content, is configured to enable the compression unit.

6. The display control unit as recited in claim 5 wherein the control circuit is configured to disable the frame generation unit responsive to the compression unit completing the compressed frame.

7. The display control unit as recited in claim 6 wherein the control circuit is configured to detect that the static content of the frames is ending, and wherein the control circuit is configured to enable the frame generation unit responsive to detecting that the static content is ending.

8. The display control unit as recited in claim 1 wherein at least two of the plurality of source buffers contain image data corresponding to overlapping pixels of the frame, and wherein the frame generation unit is configured to generate a given overlapping pixel of the frame responsive to image data from each of the at least two of the plurality of source buffers.

9. A method comprising:
   generating a frame from image data in a plurality of source buffers in memory, the frame to be displayed on a display device controlled by a display control unit that generates the frame;
   compressing the frame and writing the compressed frame to the memory responsive to an indication that a plurality of successive frames generated by the display control unit have static content; and
   reading the compressed frame from the memory and decompressing the compressed frame to provide to the display device instead of a frame generated from the image data in the plurality of source buffers, wherein the generating is not performed during a time that the decompressed frame is being displayed by the display device.

10. The method as recited in claim 9 receiving the compressed frame in a display backend circuit is configured to control an interface to the display device.

11. The method as recited in claim 10 wherein a change between a generated frame and a decompressed frame is synchronized to a vertical blanking interval of the display device.

12. The method as recited in claim 9 wherein the generating is restarted responsive to detecting that the frame to be displayed is no longer static.

13. The method as recited in claim 9 further comprising:
    monitoring display control unit hardware that performs the generating to detect that the plurality of successive frames have the static content; and
    responsive to detecting that the plurality of successive frames have the static content, enabling the compression.

14. The method as recited in claim 13 further comprising disabling the generating responsive to completing the compressed frame.

15. The method as recited in claim 14 further comprising:
    detecting that the static content is ending; and
    enabling the generating in response to detecting that the static content is ending.

16. The method as recited in claim 9 wherein at least two of the plurality of source buffers contain image data corresponding to overlapping pixels of the frame, and wherein the generating comprises generating a given pixel of the frame responsive to image data from each of the at least two of the plurality of source buffers.

17. An integrated circuit comprising:
    a memory controller configured to couple to a memory during use; and
    a display control unit coupled to the memory controller and configured to generate a frame from image data in a plurality of source buffers in memory, the frame to be displayed on a display device controlled by the display control unit, and wherein the display control unit is configured to compress the frame and write it to the memory responsive to an indication that a plurality of successive frames generated by the display control unit have static content, and wherein the display control unit is configured to read the compressed frame from memory and decompress the frame to provide to the display device instead of generating the frame, wherein circuitry configured to generate the frame from the image data is idle during a time that the decompressed frame is being displayed.

18. The integrated circuit as recited in claim 17 wherein the display control unit is further configured to detect that a new frame that is not static is to be generated, and wherein the display control unit is configured to resume generating frames responsive to detecting that the new frame is to be generated.

19. The integrated circuit as recited in claim 17 wherein a change of the selected frame between the frame generated from the image data and the decompressed frame is synchronized to a vertical blanking interval of the display device.

* * * * *